UNITED STATES PATENT OFFICE.

HENRY T. ANTHONY, OF NEW YORK, N. Y.

MODE OF PREPARING ALBUMENIZED PAPER.

Specification forming part of Letters Patent No. 41,750, dated March 1, 1864.

*To all whom it may concern:*

Be it known that I, HENRY T. ANTHONY, of the city, county, and State of New York, have invented a new and useful Method of Preparing Albumenized Paper for Photographers; and I do hereby declare that the following is a full, clear, and exact description of the same.

Heretofore the albumenized paper used in photography has been prepared by beating up the whites of eggs intimately with some soluble chloride. When floated upon the surface of this liquid and properly dried the paper was ready for use. It was then to be "sensitized" by submitting it to the action of a solution of nitrate of silver, the effect of which is well known; but in this sensitizing some operators have used a solution of nitrate of silver to which a certain proportion of the nitrate of ammonia has been added, or caused to be added by chemical action, forming "ammonia nitrate of silver." This use is subject to some difficulties arising from the fact that while being used the solution undergoes some chemical changes, whereby loss and uncertainty in the printing and toning are caused, for if the solution is alkaline in excess the albumen will be dissolved from the paper, causing bubbles and spots, while if acid is in excess the printing will be slow and the toning difficult.

My invention consists in making a direct combination or mixture of the nitrate of ammonia with the albumenizing fluid, however it may have been prepared; and some proportions which I have employed satisfactorily have varied from half a grain to two grains of nitrate of ammonia to the fluid ounce of albumen, and applying this to the paper in the usual manner of albumen.

The advantages of this method of using the nitrate of ammonia are, first, the ability to employ a solution of plain nitrate of silver of much less strength than is necessary when the paper is coated with albumen prepared in the ordinary way; second, the printing is much more rapid, varying in proportion to the quantity of nitrate of ammonia used; third, the capacity of the paper so prepared to yield brilliant tones with ease and rapidity of toning.

I claim—

Combining or mixing the nitrate of ammonia directly with the albumenizing fluid, in the manner and for the purpose substantially as set forth.

In witness whereof I have hereunto subscribed my name.

HENRY T. ANTHONY.

Witnesses:
 JOSEPH P. PIRSSON,
 S. H. MAYNARD.